US007149739B1

(12) United States Patent
Dose et al.

(10) Patent No.: US 7,149,739 B1
(45) Date of Patent: Dec. 12, 2006

(54) SYSTEM AND METHOD FOR PERFORMING RATIO PLANNING

(75) Inventors: Carol J. Dose, Zumbrota, MN (US); James T. Griffin, Rochester, MN (US); Gregory M. Heetland, Rochester, MN (US); Joseph C. Maljevec, Wappingers Falls, NY (US); Jennifer L. Matthews, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 657 days.

(21) Appl. No.: 09/865,967

(22) Filed: May 25, 2001

(51) Int. Cl.
*G06F 17/30* (2006.01)

(52) U.S. Cl. .......................... 707/100; 707/1; 707/102; 705/36 R

(58) Field of Classification Search .............. 707/1–10, 707/100–104.1, 200–205; 715/501.1, 510–513; 700/106, 111, 9; 705/1–15, 20–29, 30, 36 R; 706/45–50
See application file for complete search history.

(56) References Cited

U.S. PATENT DOCUMENTS

| | | | |
|---|---|---|---|
| 4,887,207 A | 12/1989 | Natarajan | 364/401 |
| 5,287,267 A | 2/1994 | Jayaraman et al. | 364/403 |
| 5,446,890 A * | 8/1995 | Renslo et al. | 707/104.1 |
| 5,459,656 A | 10/1995 | Fields et al. | 364/401 |
| 5,657,453 A | 8/1997 | Taoka et al. | 395/201 |
| 5,712,985 A | 1/1998 | Lee et al. | 395/207 |
| 5,778,049 A * | 7/1998 | Young et al. | 379/15.03 |
| 5,819,232 A | 10/1998 | Shipman | 705/8 |
| 6,032,125 A | 2/2000 | Ando | 705/10 |
| 6,067,525 A * | 5/2000 | Johnson et al. | 705/10 |
| 6,134,563 A * | 10/2000 | Clancey et al. | 715/503 |

(Continued)

FOREIGN PATENT DOCUMENTS

JP 9277142 10/1997

(Continued)

OTHER PUBLICATIONS

Charu Chandra, college of engineering and computer science, University of Michigan-Dearborn, Report Brief AL Based Strateg decision modeling for custom-oriented company Management Jun. 4, 2003pp 51-55.*

(Continued)

*Primary Examiner*—Srirama Channavajjala
(74) *Attorney, Agent, or Firm*—Derek S. Jennings; Cantor Colburn LLP

(57) ABSTRACT

An exemplary embodiment of the present invention is a method for performing ratio planning. The method includes building a ratio planning database, creating a pre-defined ratio planning report template that includes a coefficient of variation field, and creating a populated database that is a subset of the ratio planning database for the report template. Based on the request of a system user, the pre-defined ratio planning report is generated from the data in the template and the populated database. Additionally, a user-defined ratio planning report based on data in the ratio planning database can be generated in response to a request by a system user. Additional embodiments include a system and storage medium for performing ratio planning.

39 Claims, 3 Drawing Sheets

U.S. PATENT DOCUMENTS

| | | | |
|---|---|---|---|
| 6,338,001 B1* | 1/2002 | Steffan et al. | 700/121 |
| 6,546,303 B1* | 4/2003 | Fried et al. | 700/106 |
| 6,571,235 B1* | 5/2003 | Marpe et al. | 707/3 |
| 6,671,689 B1* | 12/2003 | Papierniak | 707/100 |
| 2001/0039506 A1* | 11/2001 | Robbins | 705/10 |
| 2002/0161764 A1* | 10/2002 | Sharo | 707/7 |
| 2003/0033229 A1* | 2/2003 | Keyes et al. | 705/36 |
| 2003/0065541 A1* | 4/2003 | Menninger | 705/7 |
| 2003/0078801 A1* | 4/2003 | Cope | 705/1 |
| 2003/0088447 A1* | 5/2003 | Desbiens et al. | 705/7 |
| 2004/0093309 A1* | 5/2004 | Nakamura et al. | 705/65 |
| 2004/0107111 A1* | 6/2004 | Barts et al. | 705/1 |
| 2004/0193515 A1* | 9/2004 | Peterson et al. | 705/30 |
| 2004/0230472 A1* | 11/2004 | Venkat et al. | 705/10 |

FOREIGN PATENT DOCUMENTS

| | | | | |
|---|---|---|---|---|
| WO | WO 97/29446 | * | 8/1997 | 17/60 |
| WO | WO 01/29722 A2 | * | 4/2001 | 17/60 |

OTHER PUBLICATIONS

Company Statements Analysis version: Beta 0.5 Nov. 11, 1998; http://businessstools.org/analysis/analysis.html.*

Saharon Rosset et al., Evaluation of Prediction Models for Marketing campaigns, Proceedings of the seventh ACM SIGKDD International conference on Knowledge discovery, 2001, pp 456-461.*

Henry D.Morris et al. White paper, "Oracle EPB: Planning, budgeting, and analysis as the Hub of perforname management", Apr. 2004, pp 1-12.*

Donald P. Ballou et al. "implications of data quality for spreadsheet analysis", vol. 18, issue 3, Mar. 1987, pp 13-19.*

* cited by examiner

SYSTEM AND METHOD FOR PERFORMING RATIO PLANNING

FIELD OF THE INVENTION

This present invention relates generally to ratio planning. More particularly, the present invention relates to a method and system for providing the tools, techniques, and information required by a ratio planner to operate an efficient and accurate process.

BACKGROUND OF THE INVENTION

Ratio planning (also known as attach rate planning) is the process of creating a forecast for a component by recognizing a relationship between the component and its parent. Ratio planning is a common practice in the computer industry and is used in other industries as well. For example, a computer manufacturer may offer a menu of sales models ranging from entry level to high end. The manufacturer will typically produce a unit demand forecast for these models. Within each model, the manufacturer will also offer various feature choices such as processor speeds, memory sizes, and graphics sizes. By analyzing historical sales data as well as current market and technology trends, the manufacturer will establish an average usage ratio between the model (the parent) and the various features (the components). The unit demand forecast of each model is then multiplied by the feature ratios of that model to produce a demand forecast for the features. A computer manufacturer may have hundreds of models to select from with each model having thousands of unique features. The combinations of features to models could number in the tens of thousands or more.

Currently, the type of data required for ratio planning may come from a variety of sources and locations. The required data may be stored in separate, disconnected databases. Sales data, for example, may be stored in a logistics system while unit costs may be stored in a financial system. In addition, some values specific to ratio planning may require derivation based on existing data. For example, feature to model sales ratios may be calculated from sales data by dividing feature to model unit sales by model unit sales. Finally, the required data may be sourced from multiple corporate locations around the globe. The nomenclature for model and feature may be different at these different locations. Because of the large amounts of data that must be gathered, often from disparate sources and in less than desirable formats, it would be advantageous to have an automated system capable of collecting and correlating ratio data in a quick and accurate manner.

Today, ratio planning data is often stored in a nomenclature that is not conducive to human interpretation. Features are typically represented by a unique numeric or alphanumeric part number. This part number is often random and provides no obvious clue as to the feature that it represents. It would be advantageous to have an easy way to tie part numbers to attributes such as family and commodity.

Ratio planning requires that vast amounts of related data be presented to planners in a coherent, concise and speedy fashion. To perform ratio planning, the planner requires data such as sales, planning and order backlog data in both unit and ratio forms. Additional data, such as statistical values like the mean, may also be valuable in ratio planning. Along with requiring particular data fields, the planner requires an efficient method to sort through the possible tens of thousands of feature to machine combinations to quickly identify ratios that are of interest to the particular planner. The criteria the planner uses to identify feature ratios of interest may be those that he plans or those with high dollar output.

Performing ratio planning typically involves additional functions beyond planning. These additional functions could include error checks, data summarizations, and forecast accuracy measurements as well as answering numerous unique, ad-hoc questions. It would be advantageous to provide an automated method that would improve the overall efficiency and accuracy of ratio planning.

SUMMARY OF THE INVENTION

An exemplary embodiment of the present invention is a method for performing ratio planning. The method includes building a ratio planning database, creating a pre-defined ratio planning report template that includes a coefficient of variation field, and creating a populated database that is a subset of the ratio planning database for the report template. Based on the request of a system user, the pre-defined ratio planning report is generated from the data in the template and the populated database. Additionally, a user-defined ratio planning report based on data in the ratio planning database can be generated in response to a request by a system user. Additional embodiments include a system and storage medium for performing ratio planning.

DETAILED DESCRIPTION OF THE INVENTION

Figure 1:
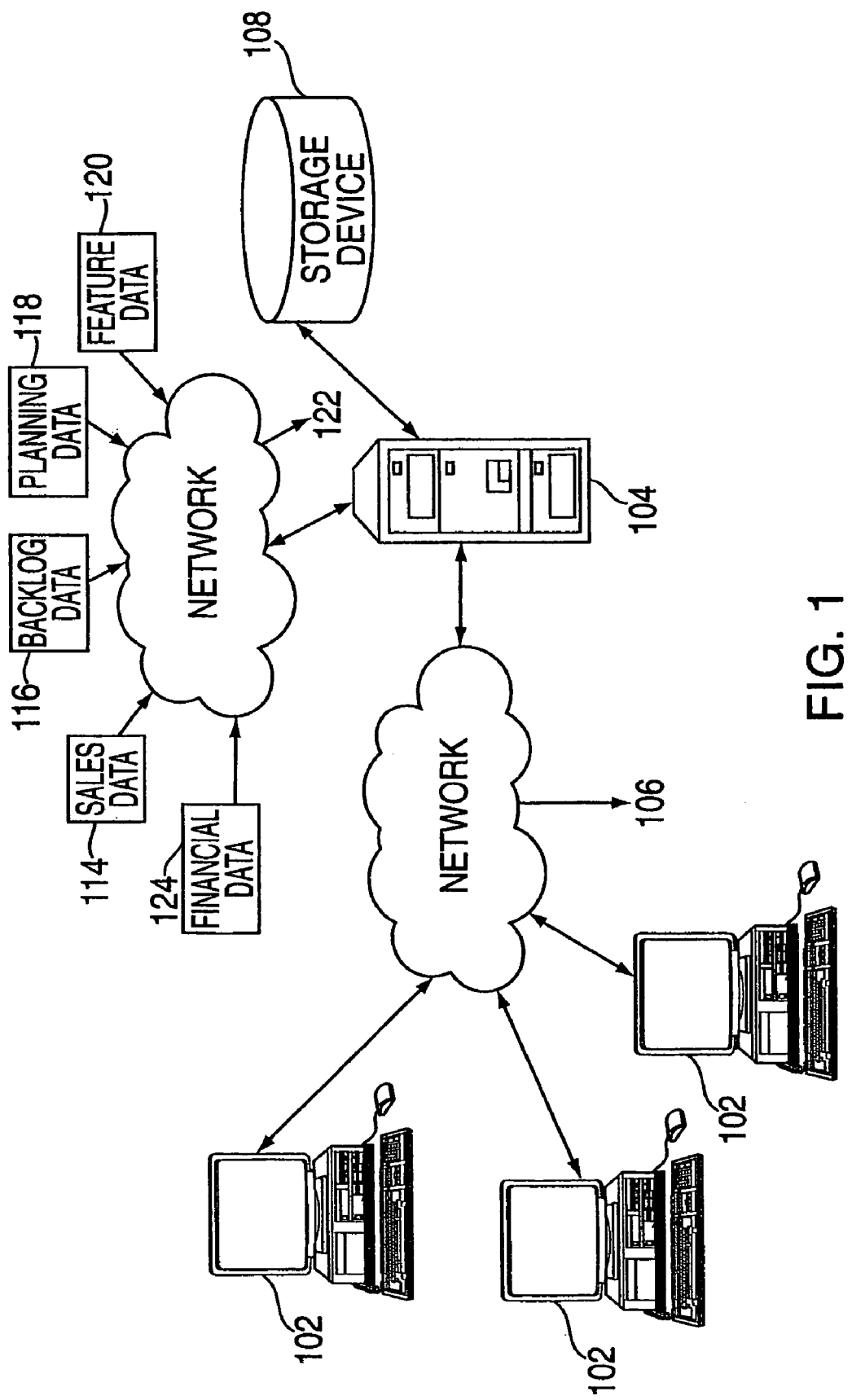
FIG. 1 is a block diagram of an exemplary system for performing ratio planning.

FIG. 1 is a block diagram of an exemplary system for performing ratio planning. The system of FIG. 1 includes user systems 102 through which a ratio planner will contact a host system 104. In a preferred embodiment, the host system 104 executes a program that performs ratio planning. The user systems 102 are coupled to a host system 104 via a network 106. Each user system 102 may be implemented using a general-purpose computer executing a computer program for carrying out the processes described herein. The user systems 102 may be personal computers or host attached terminals. If the user systems 102 are personal computers, the processing described herein may be shared by user system 102 and host system 104 by providing an applet to the user system 102.

Network 106 may be any type of known network including a local area network (LAN), a wide area network (WAN), or a global network (e.g., Internet). The user system 102 may be coupled to the host system 104 through multiple networks (e.g., intranet and Internet) so that not all user systems 102 are coupled to the host system 104 through the same network. One or more of the user systems 102 and the host system 104 may be connected to network 106 in a wireless fashion and network 106 may be a wireless network. In a preferred embodiment, network 106 is the Internet and each user system 102 executes a user interface application (e.g., web browser) to contact the host system 104 through the network 106. Alternatively, a user system 102 may be implemented using a device programmed primarily for accessing network 106 such as WebTV.

FIG. 1 also depicts the sources for ratio planning data in an exemplary embodiment of the invention. The data can come from a variety of computer systems across the network 122 or the data could come from the storage device 108 attached to the host system 104. In an exemplary embodiment, the data required for ratio planning is identified and subsequently gathered into a single, relational database stored on a storage device 108 connected to the host system 104. The sales data 114 includes model and feature to model in units. The order backlog data 116 includes model and feature to model in units. The planning data 118 includes model and feature to model in units as well as feature to model ratios. The feature attributes 120 include the description. The financial data 124 includes unit cost. This ratio planning data can be gathered from locations around the world and then consolidated into a single database stored on a storage device 108 connected to the host system 104. Sales data 114, for example, may come from a variety of manufacturing locations. The ratio planning data is gathered on a defined calendar and retained according to a records retention schedule.

The network 122 used to transfer the ratio planning data has the same attributes as the network 106 described above and could be the same physical network. This network 122 may be any type of known network including a local area network (LAN), a wide area network (WAN), and a global network (Internet). The ratio planning data may be transferred to the host system 104 through multiple networks (e.g., intranet and Internet) so that not all the ratio planning data is transferred to the host system 104 through the same network. One or more of the remote systems may be connected to the network 122 in a wireless fashion and network 122 may be a wireless network.

The host system 104 may be implemented using a server operating in response to a computer program stored in a storage medium accessible by the server. The host system 104 may operate as a network server (often referred to as a web server) to communicate with the user systems 102. The host system 104 handles sending and receiving information to and from user systems 102 and can perform associated tasks. The host system 104 may also include a firewall to prevent unauthorized access to the host system 104 and enforce any limitations on authorized access. For instance, an administrator may have access to the entire system and have authority to modify portions of the system. The firewall may be implemented using conventional hardware and/or software as is known in the art.

The host system 104 also operates as an applications server. The host system 104 executes one or more computer programs to perform ratio planning. Processing may be shared by the user system 102 and the host system 104 by providing an application (e.g., java applet) to the user system 102. Alternatively, the user system can include a stand-alone software application for performing a portion of the processing described herein. It is understood that separate servers may be used to implement the network server functions and the applications server functions. Alternatively, the network server, firewall and the applications server can be implemented by a single server executing computer programs to perform the requisite functions.

An application on the host system 104 interacts with the computer systems that supply the ratio planning source data in order to build the ratio planning database. This step involves receiving the data and populating the ratio planning database stored on the host system 104 storage device 108 with that data. One of the functions of the gathering application is to manipulate sales and order backlog data to produce values more appropriate for ratio planning. For example, feature to model unit sales from the sales data 114 are divided by model unit sales to produce feature to model sales ratios. Similarly, feature to model unit order backlog from the backlog data 116 is divided by model unit order backlog to produce feature to model order backlog ratios. Other calculated values include the coefficient of variation (COV) and the historical mean. The COV measures the relationship of the standard deviation to the mean and is an indicator to the ratio planner of which ratios exhibit relatively more or less variation.

In an exemplary embodiment of the invention one of the applications on the host system 104 constructs two basic data indices or tables, one for features and one for models. These indices can be used to segment and sort through massive amounts of ratio data and are stored on a storage device 108 connected to the host system 104. The feature data table contains all unique part numbers found in the data contained in the ratio planning database. Planners identify and catalog each part number with respect to planner owner, commodity, function, and family. The model data table contains all unique models found in the data contained in the ratio planning database. Planners identify and catalog each model with respect to brand, segment, and family. New features and models are automatically added to these tables as they are identified in the ratio planning data gathered above.

The host system 104 application also enables the creation of pre-defined reports and tables to make data retrieval more efficient. In an exemplary embodiment a default feature ratio planning report is created. This default report is based on input from the ratio planners and contains all data elements the planner typically requires in a feature ratio planning report. The report may include the following information depending on planner preference: basic data regarding the features and models; feature to model ratio for sales, feature unit cost, planning, and backlog data; model and feature to model in units for sales, planning and backlog data; and basic statistical data such as the mean and COV of the feature ratio.

Additionally, the host system 104 application aids in sifting through the huge volumes of information in an efficient manner. The two basic data tables described above, feature and model, are used to allow segmenting and sorting of data based on the classification of the features and models by criteria that includes commodity and brand. The concept of using populated database tables in conjunction with the predefined reports is designed to promote fast response time and ease of use. A populated database table corresponds to each pre-defined report and contains all data elements necessary to create the specific report. These populated database tables are also referred to as "SmartTables" because they contain the data required by each pre-defined report. Query response time of the populated database table is tremendously fast as opposed to joining and querying individual tables in succession. Populated database tables also promote ease of use since the planner is required to query against a single database table as opposed to writing complex query joins of numerous tables.

In addition to the default feature ratio planning report described above, the host system 104 application also allows the creation of a core group of pre-defined reports that will identify input errors, enable data summarization, and measure forecast accuracy. A distribution of accuracy report template can be created to show the number of ratios whose accuracy falls within four ranges. It is important to keep and track this information to identify improvement or degradation over time. In addition, a pre-defined report can be created to show the correlation between COV and accuracy. Typically, the relationship is that, on average, those ratios with higher COV's (higher variability) exhibit relatively lower accuracy than those ratios with lower COV's.

Other predefined reports can include an audit report, an average model cost report and a churn report. The audit report is a predefined report that identifies to a planner the ratios that have changed by more than a particular percentage from month to month. The percentage can be either predefined or user specified. A large percentage change may indicate an input error. The average model cost report is a predefined report that multiplies the feature ratios of each model by their unit cost to produce an average model cost, both historical and planned. The churn report is a predefined report that compares the dollarized feature plan from month to month and separates the difference into the portions caused by unit changes and portions caused by ratio changes. This is done using cost accounting volume and unit cost formulas. For example, the feature delta due to unit change can be calculated by subtracting the prior model units from the current model units and then multiplying the result by the prior model ratios. The feature delta due to ratio change can be calculated by subtracting the prior model ratio from the current model ratio and then multiplying the result by the current model units.

All of these pre-defined reports are accompanied by populated database tables stored on a storage device 108 connected to the host system 104, to promote fast response time and ease of use. In an exemplary embodiment, pre-defined report templates and the associated populated databases will be created by a system administrator based on input from ratio planners. These reports can allow for input variables so that a ratio planner can view specific subsets of the data.

Finally, since all information is stored in a database, on a storage device 108, all data can be easily mined to answer myriad, unique questions. This can be done by creating user-defined reports. All indices and tables discussed above can be used in the creation of these reports.

Storage device 108 may be implemented using a variety of devices for storing electronic information such as a file transfer protocol (FTP) server. It is understood that storage device 108 may be implemented using memory contained in a host system 104 or may be a separate physical device. Storage device 108 contains a variety of information including the ratio planning database, the index tables, the pre-defined reports, and the populated database tables. Storage device 108 may also contain information concerning the submission of the report request or transmittal of ratio planning source data (e.g. a user identifier, date and time of submission).

Figure 2:
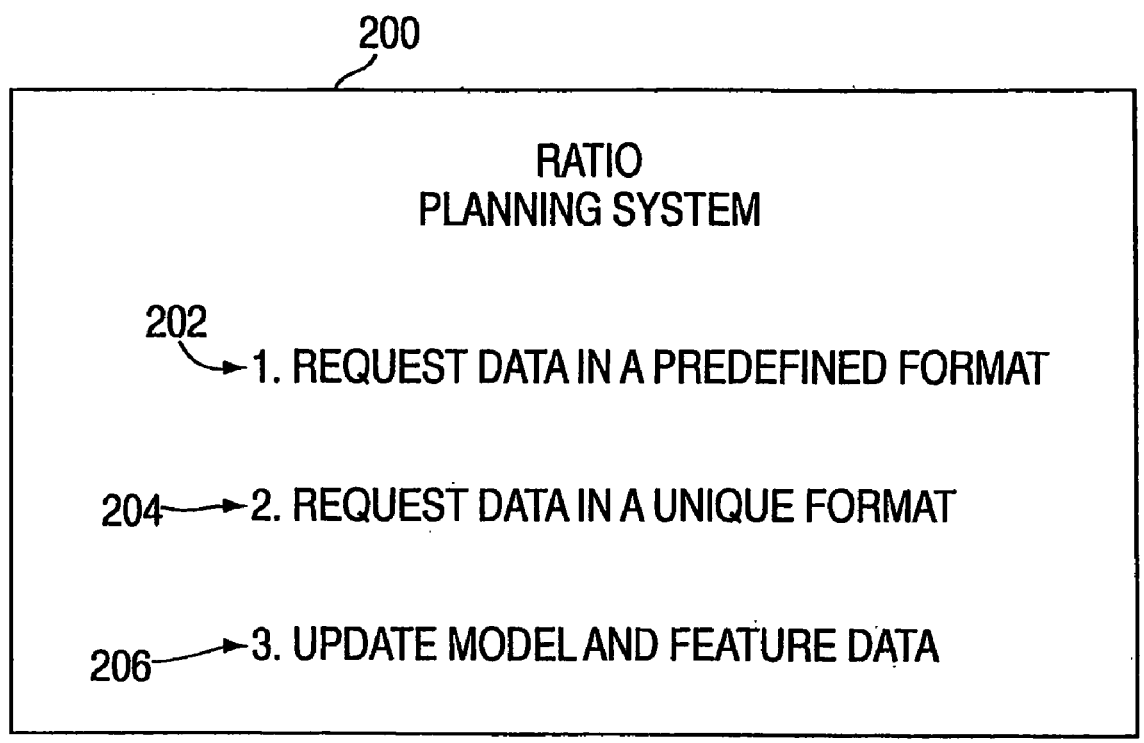
FIG. 2 depicts an exemplary user interface for performing ratio planning.
Figure 3:
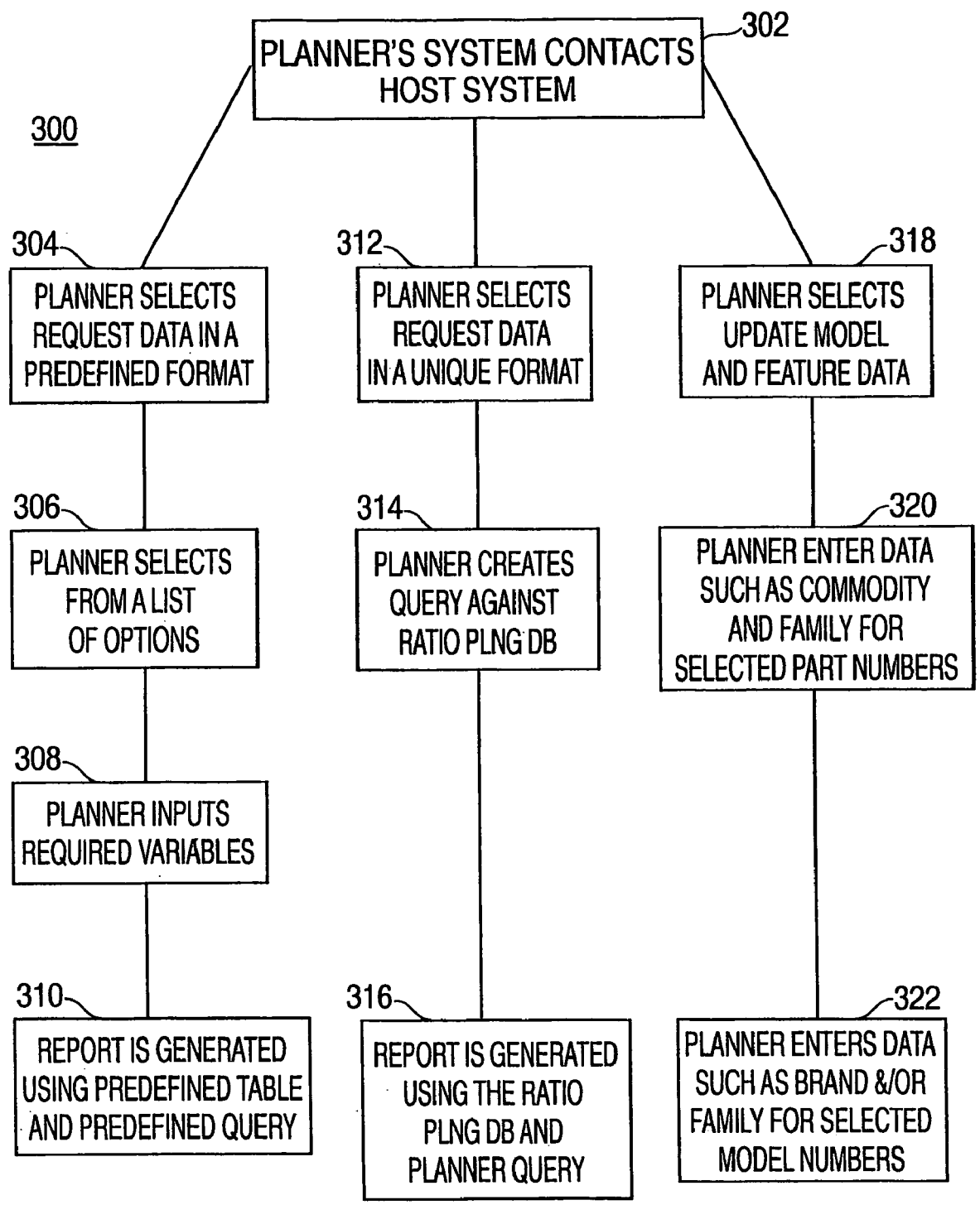
FIG. 3 is a flowchart of an exemplary process for performing ratio planning.

Operation of the system from the perspective of a ratio planner will now be described with reference to FIG. 2 and FIG. 3. FIG. 2 depicts an exemplary user interface for performing ratio planning and FIG. 3 is a flowchart of a process for performing ratio planning. The process begins at step 302 when a user system 102 contacts the host system 104. As described above, this may occur through the user system 102 contacting host system 104 using a web browser. The host system 104 may require the user to log in by providing a user name and password as is known in the art. Once the ratio planner is logged in, the screen 200 shown in FIG. 2 is presented. The user then makes a choice between the three options.

If the ratio planner chooses the first option "Request data in a pre-defined format" 202 as shown at step 304, a list of available report templates will be displayed. The ratio planner will choose a report from this list at step 306 and then be prompted to enter any variable data at step 308. Variable data could include the family or model corresponding to the parts that are of interest to the ratio planner. The report will be generated at step 310 and the ratio planner will be given the option of displaying, saving or printing the report. The report is generated using the variable data, the report template and the pre-defined database tables that are stored on a storage device 108 connected to the host system 104. The information will be sent to the user system 102 via the network 106.

Alternatively, the ratio planner could chose "Request data in a user-defined format" 204 as shown at step 312. This will require the ratio planner to have more knowledge of the underlying database structure, the indices, and the query tool. The ratio planner will be prompted, by the query tool, to create a query against the ratio planning database at step 314. Once the report query is created by the ratio planner a report is generated at step 316. Again, the ratio planner will be presented with the options of displaying, saving or printing the report.

Finally, the ratio planner could chose the third option "Update model and feature data" 206 as shown at step 318 from the main screen 200. The planner will then be prompted to enter data such as commodity code and family for selected part numbers at step 320. This option allows the ratio planner to tie together various part numbers in order to expedite the process of ratio planning and analysis. The data entered by the ratio planner will be used as indices into the ratio planning database. Similarly, the ratio planner will be prompted to enter model data such as brand and family for selected model numbers at step 322. Again, this option allows the grouping of data in order to expedite the ratio planning process. All data entered will become part of the index tables stored on a storage device 108 connected to the host system 104.

As described above, the user system 102 and the host system 104 can share the processing. For example, the user system 102 may include a software application that allows the user system to create a report request without assistance from the host system 104. The user system 102 would then contact the host system 104 to generate the report. Alternatively, the host system 104 may provide an application to the user system 102 (e.g., an applet) once the user system 102 contacts the host system 104. Accordingly, processing can be shared by the two systems.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer (such as host system 104) or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be evident to those skilled in the art that the present invention provides many improvements over the current state of the art of ratio planning. Data from a variety of systems and locations is being collected into a single database in order to provide a single, integrated repository for ratio planning data. The invention allows ratio planners to catalogue part numbers and models in order to provide some structure and meaning to the thousands of seemingly random part numbers. The cataloging provides an easy way to pull information together for reports. Additionally, the invention provides the ability, through the use of pre-defined reports, to generate reports very quickly and with a minimum of computer database expertise on the part of the ratio planner. The invention is well suited for both small manufacturers with relatively few ratios as well as very large manufacturers with tens of thousands of ratios.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore, it is intended that the invention not be limited to the particular embodiments for carrying out this invention, but that the invention will include all embodiments falling within the scope of the appended claims.

What is claimed is:

1. A method for performing ratio planning, the method comprising:
   building a ratio planning database, comprising:
   receiving data from at least one ratio planning data source, wherein said ratio planning data sources include sales data, order backlog data, planning data, feature unit cost, and feature data; and
   updating said ratio planning database with the received data;
   creating a pre-defined ratio planning report template, wherein said report template includes a coefficient of variation field;
   creating a populated database for said report template, wherein said populated database is a subset of said ratio planning database;
   generating a pre-defined ratio planning report in response to a user system request, wherein input to said pre-defined ratio planning report includes said report template and said populated database; and
   generating a user-defined ratio planning report in response to a user system request, wherein input to said user-defined ratio planning report includes said ratio planning database.

2. The method of claim 1 wherein said ratio planning database includes data values calculated based on said received data, said calculated data values including at least one of feature to model sales ratios, feature to model order backlog ratios, historical mean of feature to model sales ratios, and coefficient of variation.

3. The method of claim 1 wherein said ratio planning database includes a feature data index.

4. The method of claim 3 wherein said feature data index catalogs part numbers by at least one of planner owner, commodity, function, and family.

5. The method of claim 1 wherein said ratio planning database includes a model data index.

6. The method of claim 5 wherein said model data index catalogs models by at least one of brand, segment, and family.

7. The method of claim 1 wherein said ratio planning database is a relational database.

8. The method of claim 1 wherein said pre-defined ratio planning report template is a default feature planning report.

9. The method of claim 1 wherein said pre-defined ratio planning report template is a forecast accuracy report.

10. The method of claim 1 wherein said pre-defined ratio planning report template is an audit report.

11. The method of claim 1 wherein said pre-defined ratio planning report template is an average model cost report.

12. The method of claim 1 wherein said pre-defined ratio planning report template is a churn report.

13. A system for performing ratio planning, the system comprising:
   a storage device storing a ratio planning database, the ratio planning database receiving data from at least one ratio planning data source, wherein said ratio planning data sources include sales data, order backlog data, planning data, feature unit cost, and feature data; said storage device being updated with the received data; and
   a host system in communication with said storage device, said host system implementing a process comprising:
   creating a pre-defined ratio planning report template, wherein said report template includes a coefficient of variation field;
   creating a populated database for said report template, wherein said populated database is a subset of said ratio planning database;
   generating a pre-defined ratio planning report in response to a user system request, wherein input to said pre-defined ratio planning report includes said report template and said populated database; and
   generating a user-defined ratio planning report in response to a user system request, wherein input to said user-defined ratio planning report includes said ratio planning database.

14. The system of claim 13 wherein said storage device stores data values calculated based on said received data, said calculated data values including at least one of feature to model sales ratios, feature to model order backlog ratios, historical mean of feature to model sales ratios, and coefficient of variation.

15. The system of claim 13 wherein said storage device stores a feature data index.

16. The system of claim 15 wherein said feature data index catalogs part numbers by at least one of planner owner, commodity, function, and family.

17. The system of claim 13 wherein said ratio planning database includes a model data index.

18. The system of claim 17 wherein said model data index catalogs models by at least one of brand, segment, and family.

19. The system of claim 13 wherein said storage device stores a relational database, said relational database including said ratio planning database.

20. The system of claim 13 wherein said pre-defined ratio planning report template is a default feature planning report.

21. The system of claim 13 wherein said pre-defined ratio planning report template is a forecast accuracy report.

22. The system of claim 13 wherein said pre-defined ratio planning report template is an audit report.

23. The system of claim 13 wherein said pre-defined ratio planning report template is an average model cost report.

24. The system of claim 13 wherein said pre-defined ratio planning report template is a churn report.

25. The system of claim 13 further comprising a network providing communication between the host system and the user system.

26. The system of claim 13 further comprising a network providing communication between the storage device and said at least one ratio planning data source.

27. The system of claim 13 further comprising a network providing communication between the storage device and the host system.

28. A storage medium encoded with machine-readable computer program code for performing ratio planning, the storage medium storing instructions for causing a host system to implement a method comprising:
building a ratio planning database, comprising:
receiving data from at least one ratio planning data source, wherein said ratio planning data sources include sales data, order backlog data, planning data, feature unit cost, and feature data; and
updating said ratio planning database with the received data;
creating a pre-defined ratio planning report template, wherein said report template includes a coefficient of variation field;
creating a populated database for said report template, wherein said populated database is a subset of said ratio planning database;
generating a pre-defined ratio planning report in response to a user system request, wherein input to said pre-defined ratio planning report includes said report template and said populated database; and
generating a user-defined ratio planning report in response to a user system request, wherein input to said user-defined ratio planning report includes said ratio planning database.

29. The storage medium of claim 28 wherein said ratio planning database includes data values calculated based on said received data, said calculated data values including at least one of feature to model sales ratios, feature to model order backlog ratios, historical mean of feature to model sales ratios, and coefficient of variation.

30. The storage medium of claim 28 wherein said ratio planning database includes a feature data index.

31. The storage medium of claim 30 wherein said feature data index catalogs part numbers by at least one of planner owner, commodity, function, and family.

32. The storage medium of claim 28 wherein said ratio planning database includes a model data index.

33. The storage medium of claim 32 wherein said model data index catalogs models by at least one of brand, segment, and family.

34. The storage medium of claim 28 wherein said ratio planning database is a relational database.

35. The storage medium of claim 28 wherein said pre-defined ratio planning report template is an default feature planning report.

36. The storage medium of claim 28 wherein said pre-defined ratio planning report template is a forecast accuracy report.

37. The storage medium of claim 28 wherein said pre-defined ratio planning report template is an audit report.

38. The storage medium of claim 28 wherein said pre-defined ratio planning report template is an average model cost report.

39. The storage medium of claim 28 wherein said pre-defined ratio planning report template is a churn report.

* * * * *